July 20, 1971  P. F. MAKO  3,594,277
PROCESS FOR FERMENTING HYDROCARBONS
Filed April 23, 1968  2 Sheets-Sheet 2

INVENTOR.
PETER F. MAKO
BY Grant L. Hubbard
ATTORNEY.

3,594,277
PROCESS FOR FERMENTING HYDROCARBONS
Peter F. Mako, Fullerton, Calif., assignor to Atlantic Richfield Company, Philadelphia, Pa.
Filed Apr. 23, 1968, Ser. No. 723,457
Int. Cl. C12b 1/00; C12d 13/06
U.S. Cl. 195—28             2 Claims

ABSTRACT OF THE DISCLOSURE

A fermentor comprising a normally horizontal cylindrical chamber having closed ends and including a plurality of apertured discs rotatably mounted in the cylinder, inlet conduits for biological nutrients and air at one end of the closed cylinder and conduits for removing air, spent nutrients and biological products at the other end of the cylinder, the discs being adapted for continuously rotatably carrying portions of liquid nutrient from the bottom of the cylinder into a gas phase at the top of the cylinder, is disclosed.

BACKGROUND OF THE INVENTION

Field of the invention

The present invention relates to microbiological fermentation apparatus. More particularly, the present invention relates to a process and apparatus for producing protein containing materials through biological action on selected hydrocarbons.

DESCRIPTION OF THE PRIOR ART

Fermentation processes and devices are well known in the prior art. More recently, potentially commercially feasible processes for producing protein through biological action on hydrocarbons have been discovered. Conventional fermentation vessels are not generally satisfactory for the production of protein through fermentation of hydrocarbons because the fermentation takes place in a mixed hydrocarbon-aqueous phase and it is necessary to provide for substantially continuous stirring of the biological nutrient mixture.

Fermentors in the form of vertical tanks with a stirrer, foam breaker and cooling jacket have been proposed for use in the production of biological protein products from hydrocarbons. Foam production is often severe with such apparatus since the stirrer, often in the form of a propeller blade, must rotate at a sufficiently high speed to maintain a substantially homogeneous composition.

Such equipment is not well adapted to continuous processing because the mixture is completely homogeneous throughout and no satisfactory method is available for continuous feed and continuous removal of spent nutrient and products. Accordingly, the object of this invention is to provide an improved fermentation apparatus primarily for use in hydrocarbon fermentation processes.

SUMMARY OF THE INVENTION

Without limiting the invention, the present apparatus may be described as a horizontal elongate cylinder having end closure members at the respective ends thereof. An elongate shaft is supported concentrically through the length of the cylinder by journal bearings in the end closure members. The shaft carries a plurality of discs thereon for rotation with the shaft. Each of the discs is provided with a multiplicity of apertures therethrough. Means are provided for rotating the shaft. Inlet conduits provide means for supplying air, hydrocarbon, nutrient and buffer solutions at one end of the cylinder and, similarly, conduit means are provided in the end closure at the other end of the cylinder for removing gaseous products and the spent liquid products.

In operation, the liquid level is maintained in the cylinder by draining the liquid at a given point through the removal conduit. This provides a gas phase above the liquid phase. The shaft and the discs thereon are rotated at a sufficient velocity to continuously maintain the liquid phase in locally substantially homogeneous composition. That is, at a given point along the length of the cylinder the liquid phase will be substantially homogeneous and portions of the liquid phase will continuously be carried into the gas phase for contact with the oxygen therein and for carrying oxygen into the liquid phase. The liquid phase and the gas phase will not, however, necessarily be homogeneous throughout the length of the cylinder since, as the result of biological action, the nutrients and the air will be used up as it passes from the entry end of the cylinder to the exit end of the cylinder. It is, accordingly, a principal object of this invention to provide an improved apparatus and process for producing protein containing materials through biological consumption of hydrocarbons.

An important object of the invention is the provision of a continuous process for producing protein from hydrocarbons.

Yet another important feature and object of the invention is to provide apparatus for continuously producing protein products from hydrocarbons.

A more specific object of the invention is to provide a novel fermentation apparatus which includes a plurality of apertured discs for rotating liquid into a gas phase and gases into a liquid phase in a cylinder for continuously producing protein from hydrocarbons.

The apparatus specifically disclosed herein constitutes an object of the invention.

Further and important objects of the invention will appear from the specification which follows and from the drawings to which reference is now made.

DESCRIPTION OF THE PREFERRED EMBODIMENT

Figure 1:
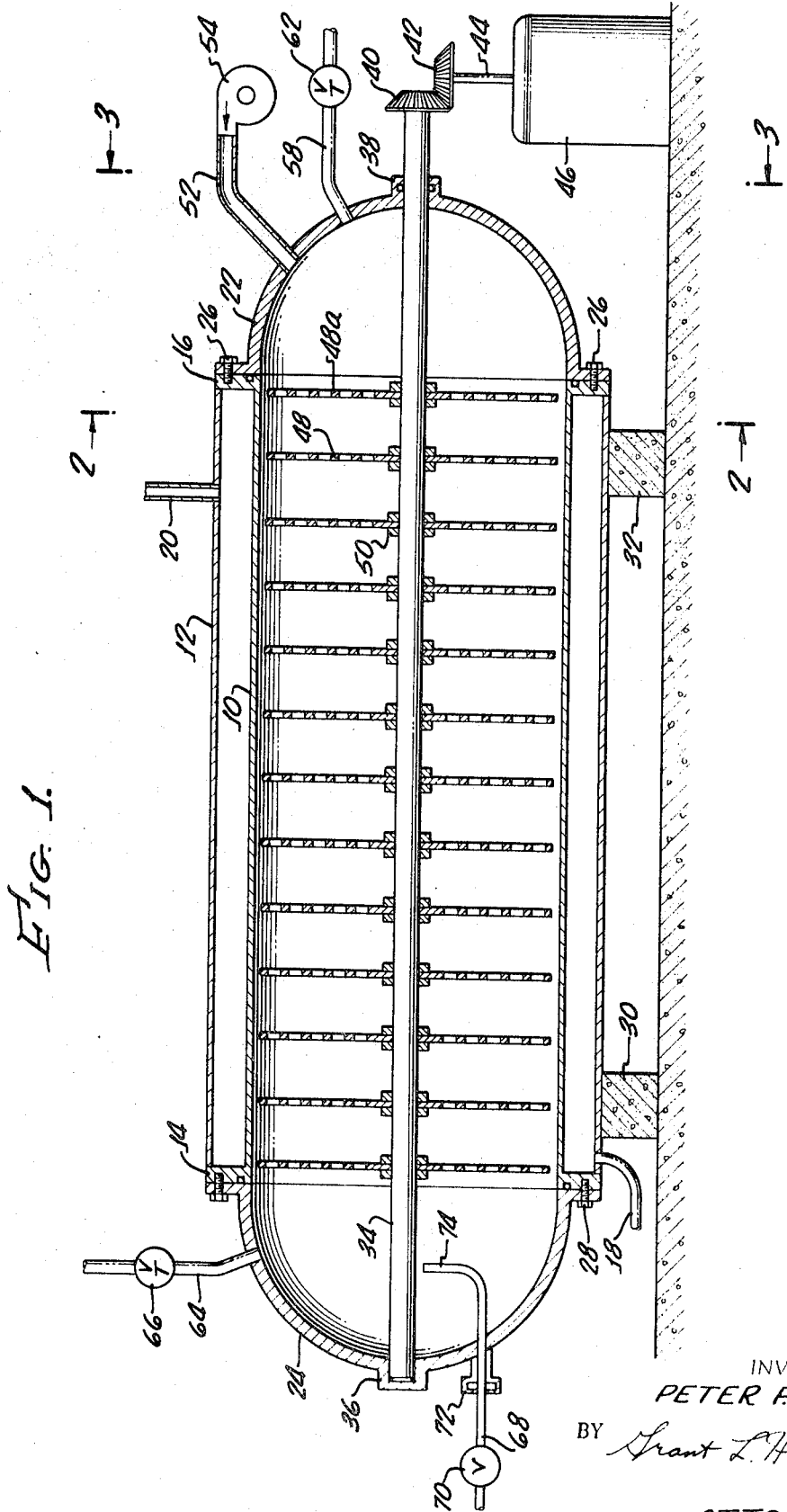
FIG. 1 is a side elevational view of the apparatus of this invention shown in cross section.

The preferred embodiment of the invention comprises, in combination, a cylindrical member made up of an inner cylindrical shell 10 and an outer cylindrical shell 12 joined together by an annular member 14 at one end and a similar annular member 16 at the other end. The two cylindrical shells 10 and 12 joined together in the manner shown in FIG. 1 form a cooling or heating jacket through which water of a desired temperature may be circulated by means of conduits 18 and 20. The jacket may be partitioned into several sections, if desired, where it is desirable to maintain different portions of the cylinder at different operating temperatures.

End closures 22 and 24 are secured, respectively, by a plurality of bolts 26 and a plurality of bolts 28 to the annular members 14 and 16 of the cylinder construction. The entire cylinder assembly is supported by blocks 30 and 32, as shown in FIG. 1.

A very important facet of the invention is the provision of an elongate shaft 34 which extends, in the preferred embodiment, from a journal bearing 36 in the closure member 24 through the length of the cylinder, along the axis thereof preferably, and through a journal bearing 38 in the other end closure 22. The shaft may be rotated in the journal bearings by any desired means, such as a hand crank or the like. In an exemplary embodiment, a bevelled gear 40 meshes with a second bevelled gear 42, the second bevelled gear being driven by a shaft 44 on a motor 46. Desirably, the motor 46 is of the variable speed type so that the speed of rotation of the shaft may be controlled.

Figure 2:
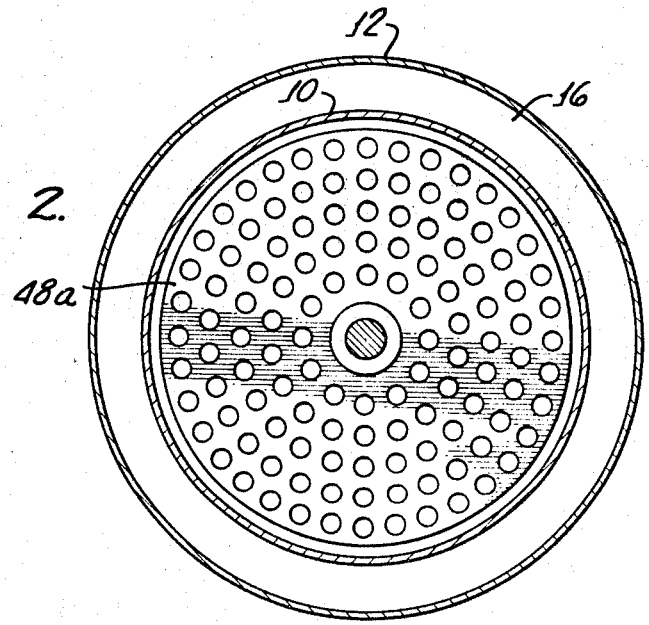
FIG. 2 is an end cross sectional view taken substantially along lines 2—2 of FIG. 1 in the direction of the arrows.
Figure 3:
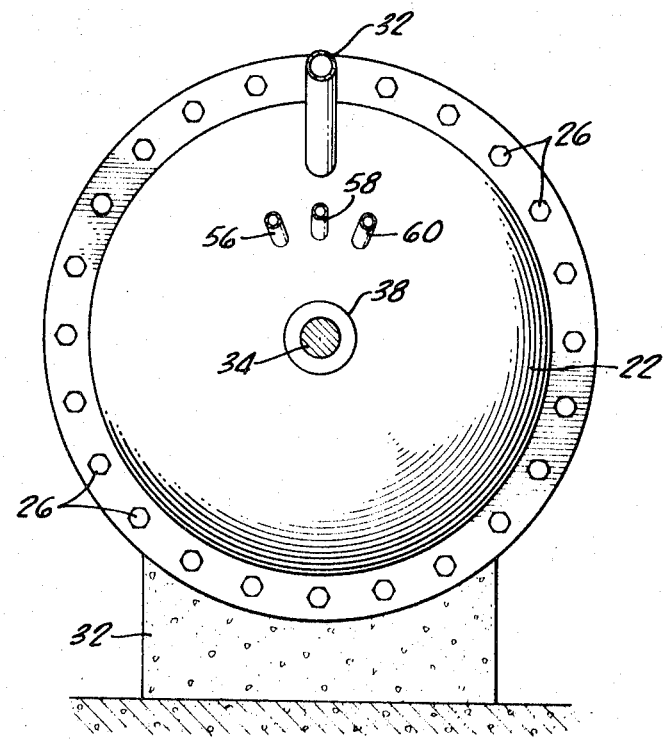
FIG. 3 is an end view taken substantially along lines 3—3 in FIG. 1 in the direction of the arrows showing the inlet conduit system.

A plurality of discs 48 are mounted by sleeves 50, or equivalent mounting means, on the shaft 34 for rotation therewith. One of these discs, 48a is shown in cross section in FIG. 1 for purposes of illustration and is shown in side elevation in FIG. 2. Each of the discs is provided with a multiplicity of apertures extending therethrough. The apertures are preferably arranged circumferentially about the axis of the disc.

In the preferred embodiment, the disc is approximately the same diameter as the inner diameter of the cylinder such that the flow of the liquid in the cylinder is regulated to a degree by the construction of the disc and the speed of rotation thereof, as will be discussed in greater detail hereinafter. It is not necessary that the disc fit very tightly inside the cylinder but a very large space between the cylinder wall and the disc should be avoided since substantial portions of the liquid may flow longitudinally along the cylinder with little co-action with the gas phase if a free path of flow between the cylinder and the disc is provided.

The inlet end of the cylinder is provided with an air inlet conduit 52 which supplies air or other gas from a pump 54.

Liquid inlet conduits 56, 58 and 60 are also provided at the inlet end of the cylinder. Each of these conduits may be provided with a throttle valve 62, as shown in conduit 58 in FIG. 1, for metering desired quantities of liquids into the inlet end of the cylinder. Conventionally such liquids would include the hydrocarbon, biological nutrient solutions, and other buffer and nutrient solutions such as a dilute solution of ammonium hydroxide.

The exit end of the cylinder is provided with a gas outlet conduit 64 which may also be provided with a throttle valve 66 if desired. It will be apparent that the pressure inside the cylinder may be regulated by means of the throttle valve 66. The effluent end of the cylinder is also provided with at least one liquid conduit 68 which may be provided with a cutoff valve 70. One or more additional liquid conduits may be provided as desired.

The liquid effluent conduit 68 is preferably received through a packing seal 72, or equivalent, for extending interiorly of the cylinder and is provided with a side arm 74 to form a generally L-shaped configuration. The conduit may selectively be rotated in the seal and moved reciprocably therethrough. This permits the interior end of the conduit to be positioned, by rotation, at the desired level for maintaining the liquid level in the cylinder.

Before proceeding to the process conditions proper, one additional important facet of the present construction is worthy of note. Reference is made to the air inlet system conduit 52 and pump or blower 54, and the air exit system, conduit 64 and the valve 66. It will be apparent that the rate of air flow from one end of the cylinder to the other will be a function of the capacity of the blower 54, the conduit sizes and the setting of the valve 66. While other means of controllably varying the air flow through the cylinder are available, such as varying the speed of the blower 54, let it be assumed that the air flow through the cylinder is to be controlled by the setting of valve 66. Thus, simply by adjusting valve 66 the air available to the biological system can be controlled. An important ancillary benefit also results. It is well known that biological systems of the type under consideration are highly exothermic and that it is necessary to remove rather large quantities of heat. For this purpose, the water jacket is provided. Water jackets, in general, are not very efficient for heat removal in such systems because only a small portion of the body of the liquid is in contact with the wall of the cylinder at any given time. It would, of course, be more desirable to remove a substantial portion of the heat of biological reaction at the point of reaction. The present apparatus permits an approach to this ideal condition. As the air flows through the cylinder, there is an exchange of heat from the biological liquid medium with the air and there is a constant evaporation of the liquid into the flowing air stream. The liquid is made up from the feed system. Since the biological action requires oxygen, in the normal case, maximum biological reactivity occurs on the discs as they rotate through the gas phase and, consequently, the maximum heat production is in the gas phase. Since the gas (air) flow is controllable, the rate of heat removal by heat exchange and evaporative cooling can be controlled simply by adjusting valve 66.

While it is desirable to provide the cooling jacket in the manner described, it is not essential to the invention, except perhaps as a safety backup measure and for initially raising the temperature of the reaction medium if desired. Precise temperature control can be effected by controlling the rate of flow of air through the cyclinder. The advantages of this means of temperature control over the available means of temperature control in the devices of the prior art will be apparent to the skilled researcher.

The process of the present invention may be carried out as follows. First, the desired quantity of the selected hydrocarbon, nutrient solution, and nutrient buffer solution is introduced into the cylinder to provide the selected liquid level. The liquid level in the cylinder may be determined and maintained by the disposition of the exit conduit 68 in the effluent end of the cylinder. Once the desired liquid level is attained, the temperature of the mixture is raised as desired by flowing water of the selected temperature through the water jacket. Air is introduced from the pump 54 and flows along the upper portion of the cylinder and exits through the conduit 64. During operation, the motor 46 is energized and the shaft 34 with the discs 48 thereon rotates at the selected velocity. The rotational velocity must be determined according to the specific liquids being handled since the amount of the liquid which will be carried into the gas phase and the rotation necessary to provide a locally homogeneous phase will depend upon the viscosity of the aqueous and organic phases and upon the relative interfacial tension between the two phases. As the discs rotate, however, they form a partial barrier to the flow of liquid along the length of the cylinder. Thus, the liquid phase is continuously carried into the gas phase, the gas phase is continuously intermixed into the liquid phase and the flow of the liquid phase is controlled by the rotation of the apertured discs so that circular layers of liquid are continuously carried into the air by the discs.

At lower rotational velocities, the predominant flow will be linearly along the length of the cylinder. As the rotational velocity of the discs increase, however, the rotational flow of the liquid will tend to predominate. Thus, a plurality of locally homogeneous gas-aqueous-hydrocarbon zones may be formed. As a result of biological action, however, the liquid flowing toward the effluent end of the cylinder will not be of the same composition as the entering liquid. Thus, the liquid flowing toward each successive disc will differ slightly from the liquid flowing toward the previous disc. A plurality of locally homogeneous biological reaction zones is thus provided in a single liquid container. This is an important advantage over the homogeneous fermentation apparatus of the prior art.

It will be realized, based upon the foregoing considerations, that it may be desirable to provide a different ratio of gas-hydrocarbon-aqueous phase contact along the length of the cylinder. This is easily done in the present invention simply by providing discs which have differing sizes of apertures and differing numbers of apertures therein.

For example, let it be assumed that it is desired to provide maximum air contact with the liquid phase and maximum intermixture of the liquid phase at the first stage and minimum air contact and liquid intermixture at the last stage of the reaction zone in the cylinder. In this case, the first disc would be provided with a very large number of comparatively small apertures therethrough whereas the last disc along the length of the cylinder would be provided with a small number of relatively larger apertures. A continuum of disc constructions along the length of the cylinder may obviously be provided.

It will be understood that, since the microbiological action is normally exothermic, once the reaction is initiated it may be necessary to substitute a cooling water of the desired temperature for the initial water used to raise the temperature to the desired reaction temperature. The reaction temperature, therefore, may be controlled by regulating air flow rate or the temperature of the water in the cooling jacket. As previously indicated, a segmented cooling jacket may be provided by placing annular baffles at spaced points along the length of the cylinder in the jacket and providing additional inlet and outlet conduits.

A specific embodiment of the invention may be described as follows, without limiting the actual construction or size of the apparatus thereto. The interior cylindrical diameter may be 10 inches and the length of the cylinder may be 60 inches. The outer cylinder, 12, may have a diameter of 12 inches, thus providing a water jacket of approximately 1 inch thickness. Approximately 60 discs may be mounted along the length of a 1 inch shaft axially of the cylinder. Each of the discs is between $1/32$ and $1/4$ inch in thickness and preferably between $1/32$ and $1/16$ inch in thickness. In an exemplary embodiment, the discs are $1/16$ inch in thickness and perforated in a plurality of circles about the axis through which the shaft extends with $3/16$ inch apertures. Apertures up to $1/2$ inch in diameter may effectively be used, however. The discs are rotated at speeds between about 1 and about 300 r.p.m. although higher velocities may be desired if larger apertures are used. Velocities between about 30 and about 60 r.p.m. are normally preferred.

The cylinder, including the space provided by domed end closures contains approximately 300 litres. From about $1/4$ to about $1/2$ of the cylinder volume, and preferably about $1/3$, is filled with liquid. The liquid comprises the hydrocarbon and aqueous nutrient solutions. Preferably about $2/3$ of the cylinder is reserved for a gas phase. As the discs are rotated, the two liquid phases are intimately intermixed and are carried into the gas phase and, simultaneously, gas is carried into the liquid phase by means of the apertures in the discs.

The velocity of the liquid flow through the cylinder will be controlled by the rate of feed input, although local control of flow may be regulated by varying thhe speed of rotation of the discs.

Flow rates of the liquid through the cylinder may be controlled at any desired rate. Flow rates may range from about .001 to about 10 litres per hour and preferably about .001 to about 1 litre per hour. The residence time of the liquid nutrient in the cylinder is, consequently, from about 10 hours to greater than 1,000 hours, depending upon the desired flow rates. Often, the optimum residence time for maximum production of protein from hydrocarbon will control the residence time. Obviously, the size of the reaction cylinder and the associated equipment may be varied according to the desired residence time to produce protein at a commercially attractive rate.

In the exemplary embodiment, the vessel and all the equipment associated therewith is constructed of stainless steel; however, any desired material may be used. For example, it may be desirable to construct the equipment of mild steel but to coat the surfaces which come in contact with the biological media with glass or a polymer. Alternatively, the entire apparatus, including the cylinder, the shaft, and the discs may be constructed of glass or of a desired plastic material, such as polyvinyl chloride. Preferably, the discs, at least, are constructed of a material which is readily wet by both the aqueous and the organic phases.

In an exemplary embodiment of the process, a hydrocarbon such as a $C_{18}$ straight paraffin and an aqueous nutrient solution in the ratio of about 0.5 to 2.0 is introduced at one end of the cylinder and allowed to flow at a rate of about .1 litre per hour through the cylinder. Air at a pressure from about 1 to about 20 atmospheres, and preferably about 1.25 atmospheres, is maintained above the liquid phases. The liquid flows to the first disc where it is rotated into the gas phase for contacting the oxygen therein. The liquid then flows successively to the second disc where it is rotated into the gas phase again, then to the third disc where it is similarly rotated into the gas phase, etc. along the length of the cylinder. The spent nutrient solution containing the protein produced is then removed from the cylinder. Fresh nutrient and hydrocarbon may continuously be introduced into the cylinder.

The biological media and nutrient solutions are described by Miller, et al., Growth of a Yeast of Normal Alkanes, Biotechnology and Bioengineering, vol. VI, pp. 299–307 (1964). Yeast such as Candida intermedia have been found to be effective in reactions of this type. The nutrient medium includes $KH_2PO_4$, $MgSO_4$, $CaCl_2$, $NH_4Cl$, $CuSO_4$, Ki, $FeCl_3$, $MnSO_4$, $Na_2MOO_4$ and $ZnSO_4$. Reference is made to the aforementioned publication and the references cited therein for further explanation of the conditions and materials useful in carrying out the desired process in the inventive apparatus.

It will be understood that the exemplary embodiments of the apparatus and of the process are presented to illustrate the application of the invention and are not intended in the limiting sense. Modifications will be apparent to those skilled in the art from the foregoing disclosure and it is contemplated that such modifications may be made without departing from the spirit and scope of the invention as defined in the following claims.

I claim:

1. A process for producing protein by fermentation of hydrocarbon materials comprising the steps of:
    introducing hydrocarbon and aqueous containing microorganisms nutrient liquids into one end of a closed elongate horizontal fermentation reaction zone;
    introducing air into said one end of said reaction zone;
    removing air from the other end of said reaction zone;
    continuously carrying circular layers of liquid into the air in the reaction zone in a plurality of successive linearly spaced positions in said reaction zone; and
    removing spent nutrients and biological products from the other end of said reaction zone.

2. The process of claim 1 further comprising the step of:
    controllably varying the air flow through the reaction zone for controlling the temperature of the biological media therein.

References Cited

UNITED STATES PATENTS

| | | | |
|---|---|---|---|
| 3,201,327 | 8/1965 | Beck | 195—28 |
| 3,355,296 | 11/1967 | Perkins et al. | 195—28 |

ALVIN E. TANENHOLTZ, Primary Examiner

U.S. Cl. X.R.

195—3, 142, 143

PO-1050
(5/69)

UNITED STATES PATENT OFFICE
CERTIFICATE OF CORRECTION

Patent No. 3,594,277          Dated July 30, 1971

Inventor(s)  Peter F. Mako

It is certified that error appears in the above-identified patent and that said Letters Patent are hereby corrected as shown below:

IN THE CLAIMS

Claim 1, line 3 after "aqueous" insert --nutrient liquids--.

line 4 cancel "nutrient liquids".

Signed and sealed this 13th day of June 1972.

(SEAL)
Attest:

EDWARD M. FLETCHER, JR.
Attesting Officer

ROBERT GOTTSCHALK
Commissioner of Patents